United States Patent
Kai et al.

(10) Patent No.: US 8,276,825 B2
(45) Date of Patent: Oct. 2, 2012

(54) RADIO FREQUENCY IDENTIFICATION TAG AND ANTENNA

(75) Inventors: Manabu Kai, Kawasaki (JP); Teruhisa Ninomiya, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 419 days.

(21) Appl. No.: 12/578,685

(22) Filed: Oct. 14, 2009

(65) Prior Publication Data
US 2010/0108770 A1    May 6, 2010

(30) Foreign Application Priority Data
Nov. 4, 2008    (JP) .................................. 2008-283651

(51) Int. Cl.
G06K 19/06    (2006.01)
(52) U.S. Cl. ........................................................ 235/492
(58) Field of Classification Search .................. 235/492, 235/439; 340/572.1, 572.7; 343/749
See application file for complete search history.

(56) References Cited

U.S. PATENT DOCUMENTS

| | | | |
|---|---|---|---|
| 7,516,901 B2 * | 4/2009 | Yamagajo et al. | 235/492 |
| 2005/0024287 A1 | 2/2005 | Jo et al. | |
| 2005/0200539 A1 * | 9/2005 | Forster et al. | 343/749 |
| 2006/0032926 A1 * | 2/2006 | Baba et al. | 235/492 |
| 2006/0208955 A1 | 9/2006 | Kai et al. | |
| 2006/0214793 A1 | 9/2006 | Baba | |
| 2006/0244600 A1 | 11/2006 | Baba | |
| 2007/0040028 A1 | 2/2007 | Kawamata | |
| 2007/0252770 A1 | 11/2007 | Kai et al. | |
| 2008/0040913 A1 | 2/2008 | Baba | |
| 2008/0042852 A1 | 2/2008 | Baba et al. | |
| 2008/0111695 A1 | 5/2008 | Yamagajo et al. | |
| 2009/0096701 A1 | 4/2009 | Kai et al. | |

FOREIGN PATENT DOCUMENTS

| | | |
|---|---|---|
| CN | 101122968 | 2/2008 |
| CN | 101228663 | 7/2008 |
| EP | 1 887 496 | 2/2008 |
| EP | 1 912 284 | 4/2008 |
| JP | 2006-268090 | 10/2006 |
| JP | 2006-295879 | 10/2006 |
| JP | 2007-52660 | 3/2007 |
| JP | 2007-295395 | 11/2007 |
| JP | 2008-40950 | 2/2008 |
| KR | 10-2007-0105817 | 10/2007 |
| KR | 10-2008-0013676 | 2/2008 |

OTHER PUBLICATIONS

Korean Office Action issued Feb. 11, 2011 in corresponding Korean Patent Application 10-2009-0102259.
Extended European Search Report for corresponding European Application 09172324.7-2210; dated Dec. 29, 2009.

* cited by examiner

*Primary Examiner* — Seung Lee
(74) *Attorney, Agent, or Firm* — Staas & Halsey LLP

(57) ABSTRACT

A radio frequency identification tag includes: a resilient base sheet; an electronic component; a reinforcing member having at least one concave portion at a periphery of the reinforcing member; and an antenna including a dipole portion and an inductance portion, the inductance portion having an impedance matching with that of the electronic component and being formed in a loop shape; the inductance portion being partly covered by the reinforcing member, the loop shape of the inductance portion being narrowed where the loop shape runs under the concave portion of the periphery of the reinforcing member and being widened outside of the reinforcing member.

20 Claims, 9 Drawing Sheets

RADIO FREQUENCY IDENTIFICATION TAG AND ANTENNA

CROSS-REFERENCE TO RELATED APPLICATION

This application is based upon and claims the benefit of priority of the prior Japanese Patent Application No. 2008-283651, filed on Nov. 4, 2008, the entire contents of which are incorporated herein by reference.

FIELD

A certain aspect of the embodiments discussed herein relates to a technique of a radio frequency identification tag.

BACKGROUND

A wireless tag includes an antenna and a circuit chip electrically connected to the antenna. The antenna includes an inductance section and a dipole section. The inductance section performs impedance matching with the circuit chip. The impedance matching is performed by approximating a radiation resistance value of the antenna with respect to the capacitance of the circuit chip, and resonating the inductance of the antenna and the capacitance of the circuit chip.

Japanese Laid-open Patent Publication No. 2006-268090 discloses a technique of a tag-use antenna.

SUMMARY

According to an aspect of an embodiment, a radio frequency identification tag includes: a resilient base sheet; an electronic component; a reinforcing member having at least one concave portion at a periphery of the reinforcing member; and an antenna including a dipole portion and an inductance portion, the inductance portion having an impedance matching with that of the electronic component and being formed in a loop shape; the inductance portion being partly covered by the reinforcing member, the loop shape of the inductance portion being narrowed where the loop shape runs under the concave portion of the periphery of the reinforcing member and being widened outside of the reinforcing member.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Hereinafter, an embodiment according to the present invention will be described with reference to the drawings.

Figure 1:
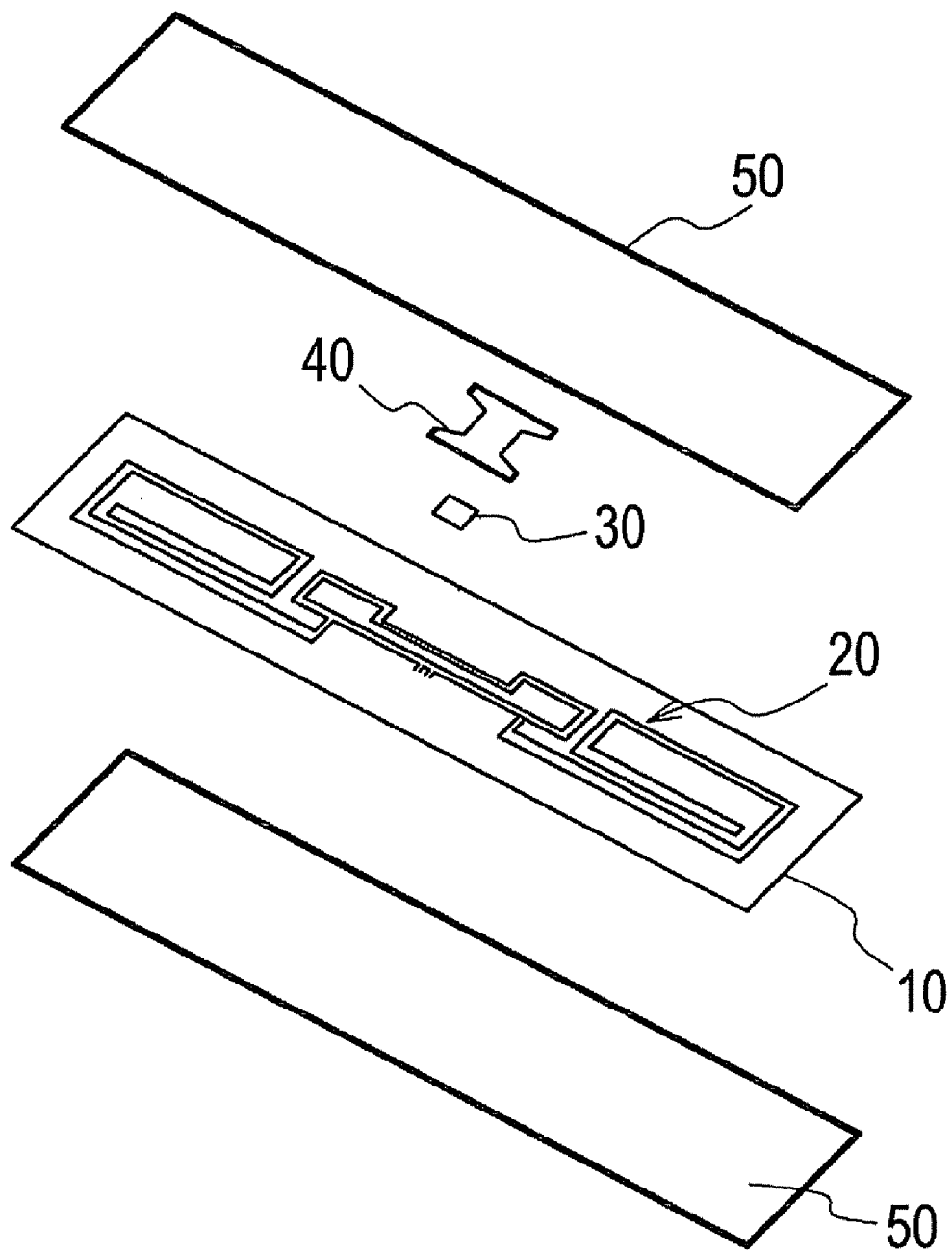
FIG. 1 is a perspective view illustrating a configuration of a wireless tag.

FIG. 1 is a perspective view illustrating a configuration of a wireless tag. The wireless tag 1 includes a resilient base sheet 10, an antenna 20, a circuit chip 30, a reinforcing member 40, and resin 50.

The resilient base sheet 10 is made of a PET (Polyethylene terephthalate) film and has flexibility. The size of the entire resilient base sheet 10 is about 60 mm in length and 15 mm in width. The antenna 20 is provided on the resilient base sheet 10. The antenna 20 is arranged on the resilient base sheet 10 along the longitudinal direction of the resilient base sheet 10. For example, the antenna 20 is formed by screen printing conductor paste on the resilient base sheet 10. The size of the entire antenna 20 is about 53 mm in length and 7 mm in width. The circuit chip 30 is electrically connected to the antenna 20 and performs wireless communication. The reinforcing member 40 covers the circuit chip 30 provided on the resilient base sheet 10. The reinforcing member 40 is made of a fiber-reinforced resin. The circuit chip 30 is covered by the reinforcing member 40, so that the circuit chip is prevented from being damaged. The resin 50 covers both entire sides of the resilient base sheet 10 along with the antenna 20 and the circuit chip 30. The reinforcing member 50 is made of a synthetic resin. Since the wireless tag 1 is covered by the resin 50, the durability of the wireless tag 1 is improved.

Figure 2:
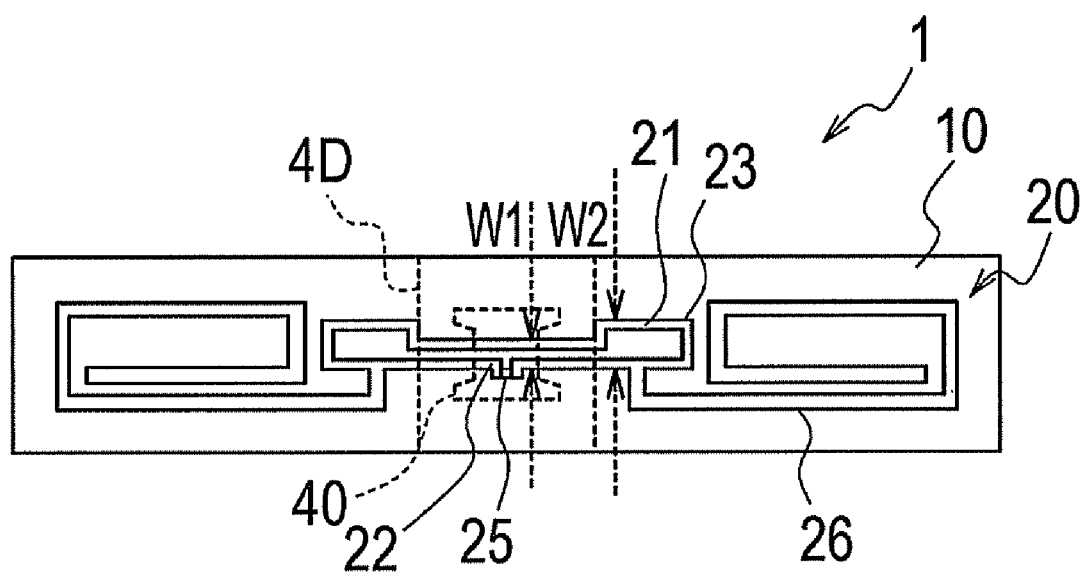
FIG. 2 is a front view of the wireless tag.

FIG. 2 is a front view of the wireless tag 1. The circuit chip 30 is omitted, and the reinforcing member 40 is represented by dashed lines. The antenna 20 includes an inductance section 21 and a dipole section 26. The inductance section 21 is formed in a loop shape. The inductance section 21 is formed in a concave shape when seen from the front. A power supply section 25 for supplying electric current to the circuit chip 30 is formed in the center of the inductance section 21. The power supply section 25 is electrically connected to the circuit chip 30. The dipole section 26 is formed in a spiral shape. Details of the reinforcing member 40 will be described below.

The inductance section 21 includes a covered section 22 covered by the reinforcing member 40 and a non-covered section 23 not covered by the reinforcing member 40. The minimum width W1 of the covered section 22 is different from the maximum width W2 of the non-covered section 23. Specifically, the width W2 of the non-covered section 23 is larger than the width W1 of the covered section 22. The width W1 is, for example, about 1.5 mm, and the width W2 is, for example, about 3.0 mm. The peripheral area 4D of the reinforcing member 40 is an area for accommodating displacement of the reinforcing member 40 when bonding the reinforcing member 40 on the resilient base sheet 10, and the width of the inductance section 21 in the area 4D is set to the same width W1 as that of the covered section 22. In this way, by changing the width of the covered section 22 from the width of the non-covered section 23, a sufficient length of the entire inductance section 21 is secured. The reason for securing the sufficient length of the entire inductance section 21 is to achieve impedance matching with the circuit chip 30 having a relatively small capacitance.

The impedance matching will be briefly described.

Figure 3:
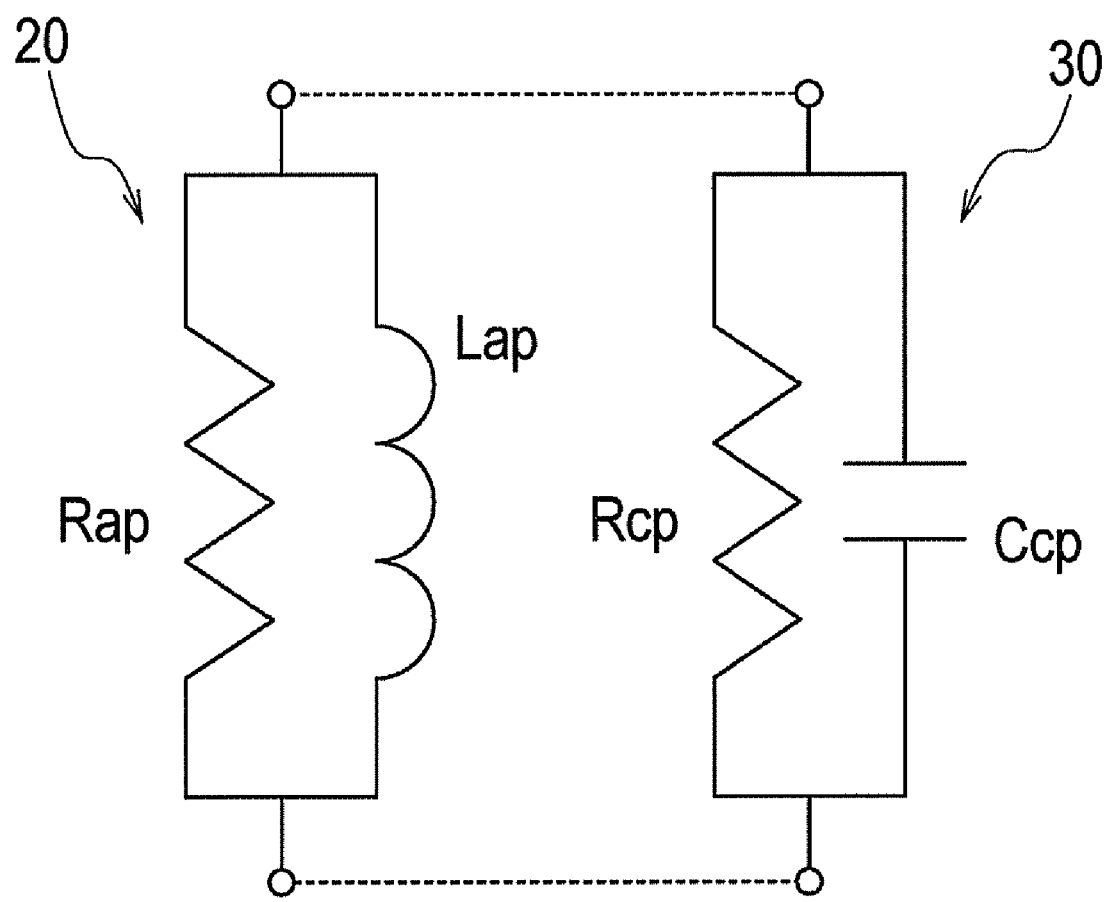
FIG. 3 is an equivalent circuit diagram of an antenna and a circuit chip.

FIG. 3 is an equivalent circuit diagram of the antenna 20 and the circuit chip 30. As illustrated in FIG. 3, the antenna 20 can be equivalently represented by a parallel circuit of a radiation resistance Rap and an inductance Lap. The circuit chip 30 can be equivalently represented by a parallel circuit of an internal resistance Rcp and a capacitance Ccp. The capacitance Ccp and the inductance Lap resonate due to the antenna 20 and the circuit chip 30 being connected in parallel. In this way, the impedance matching is achieved at a desired resonant frequency fo ($=1/2\pi\sqrt{(LC)}$), and received power at the antenna 20 is fully provided to the circuit chip 30. A frequency around 953 MHz is used in Japan, a frequency around 868 MHz is used in Europe, and a frequency around 915 MHz is used in the USA.

To achieve impedance matching with the circuit chip 30 having a relatively small capacitance Ccp, the inductance Lap needs to be a large value. To increase the inductance Lap, the length of the inductance section 21 of the antenna 20 needs to be long. As illustrated in FIG. 2, to secure a sufficient length of the inductance section 21, the width W2 of the non-covered section 23 is set to be larger than the width W1 of the covered section 22.

Figure 4:
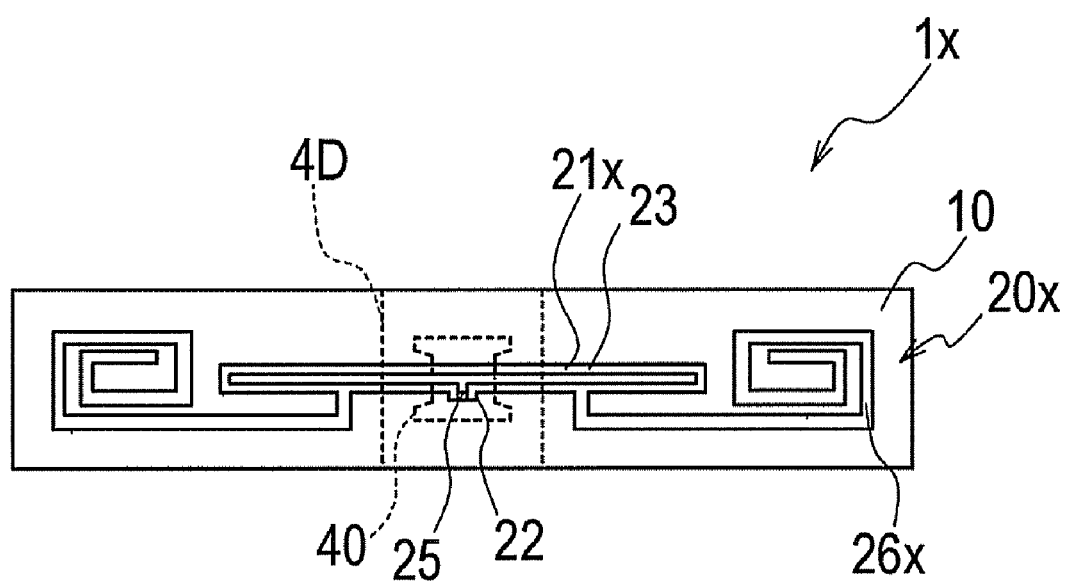
FIG. 4 is a front view of a wireless tag having a different structure from the wireless tag according to the embodiment.

Next, a wireless tag 1x having a different structure from the wireless tag 1 will be described. FIG. 4 is a front view of the wireless tag 1x having a different structure from the wireless tag 1. The circuit chip is omitted in the figure, and the reinforcing member 40 is represented by dashed lines. The shape of an antenna 20x of the wireless tag 1x is different from the shape of the antenna 20 of the wireless tag 1. In the antenna 20x, the covered section 22 and the non-covered section 23 have the same width. Specifically, the width of the covered section 22 and the non-covered section 23 is the same as the width W1 of the covered section 22 of the antenna 20 of the wireless tag 1. Therefore, when employing a circuit chip having a relatively small capacitance Ccp in a wireless tag 1x, as illustrated in FIG. 4, the inductance section 21x needs to be long in order to achieve impedance matching.

When the inductance section 21x is long, it is necessary to secure a sufficient length of the dipole section 26x in an area smaller than that of the dipole section 26 of the wireless tag 1. To secure a sufficient length of the inductance section 21 in a small area, as illustrated in FIG. 4, the dipole section 26x has a multi-folded shape. Since the dipole section 26x has such a shape, there is a risk that the antenna gain of the antenna 20x decreases and the communication distance becomes short. When making the wireless tag 1x compatible with the frequency (868 MHz) used in Europe, the length of the dipole section 26 needs to be 953/868 times as long, so that the entire wireless tag 1x needs to be up-sized.

However, in the same way as the wireless tag 1 illustrated in FIG. 2, the length of the covered section 22 and the non-covered section 23 of the inductance section 21 are different, so that it is possible to secure a sufficient area of the dipole section 26 while securing a sufficient length of the inductance section 21. In this way, the dipole 26 can have a shape including relatively few folded portions. Therefore, the decrease of the antenna gain is suppressed, and the communication distance becomes long. In this way, the antenna 20 can be used for a circuit chip having a relatively small capacitance. Even when making the wireless tag 1 compatible with the frequency (868 MHz) used in Europe, it is possible to secure a sufficient length of the dipole section 26 while maintaining the small size of the wireless tag 1.

Figure 5:
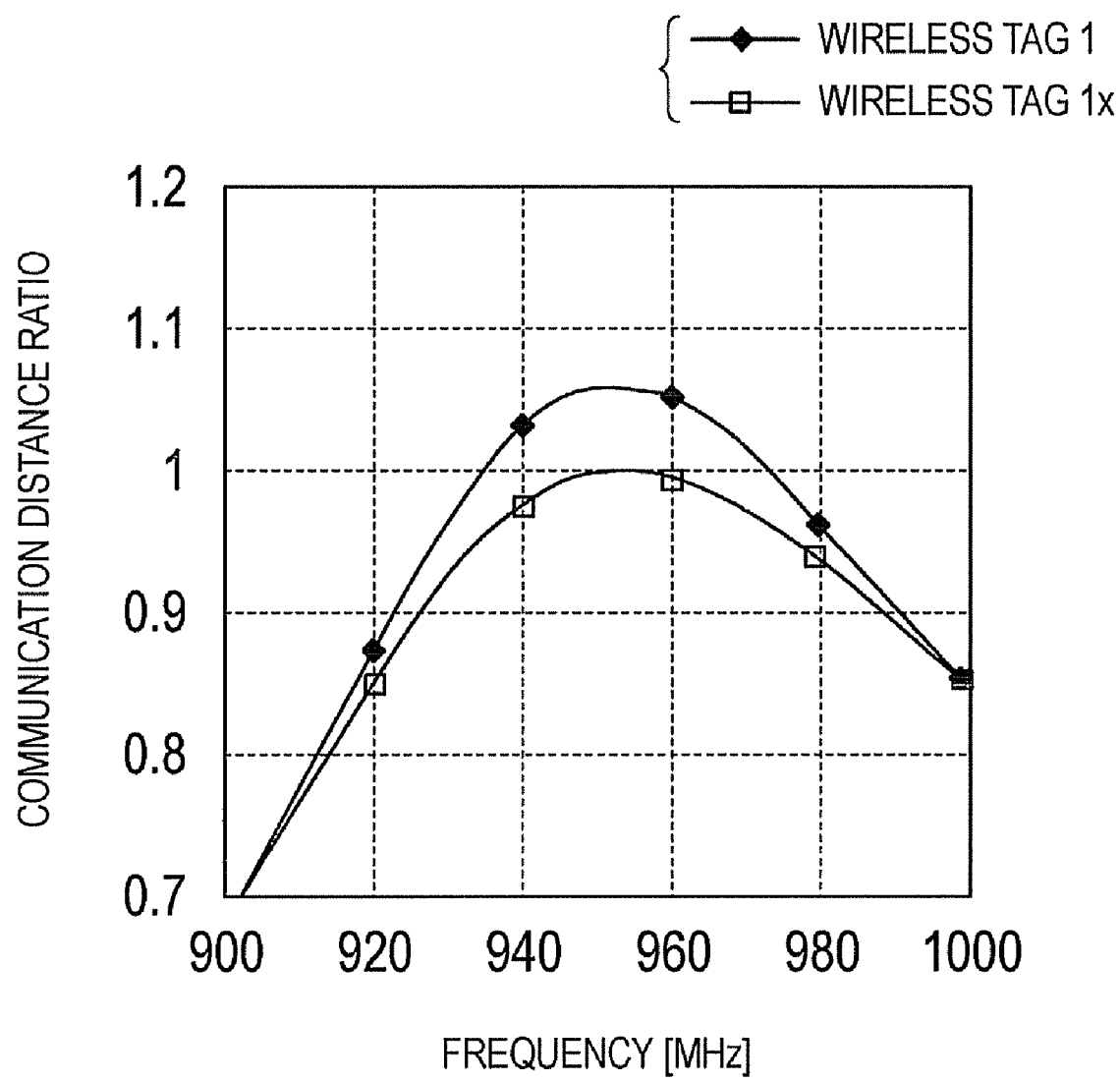
FIG. 5 is a graph comparing communication distances of the wireless tag according to the embodiment and the wireless tag having the different structure from the wireless tag according to the embodiment.

FIG. 5 is a graph comparing communication distances of the wireless tag 1 and the wireless tag 1x. The horizontal axis is frequency, and the vertical axis is communication distance ratio. The communication distance ratio of the horizontal axis is ratios of the communication distances of the wireless tags 1 and 1x when the communication distance of the wireless tag 1x whose frequency is set to 958 MHz is assumed to be the wireless tag 1. The results illustrated in the graph are calculated for the wireless tags 1 and 1x both of which are not covered by the resin 50. As illustrated in FIG. 5, the communication distance of the wireless tag 1 is longer than that of the wireless tag 1x between frequencies of 900 MHz and 1000 MHz.

Figure 6:
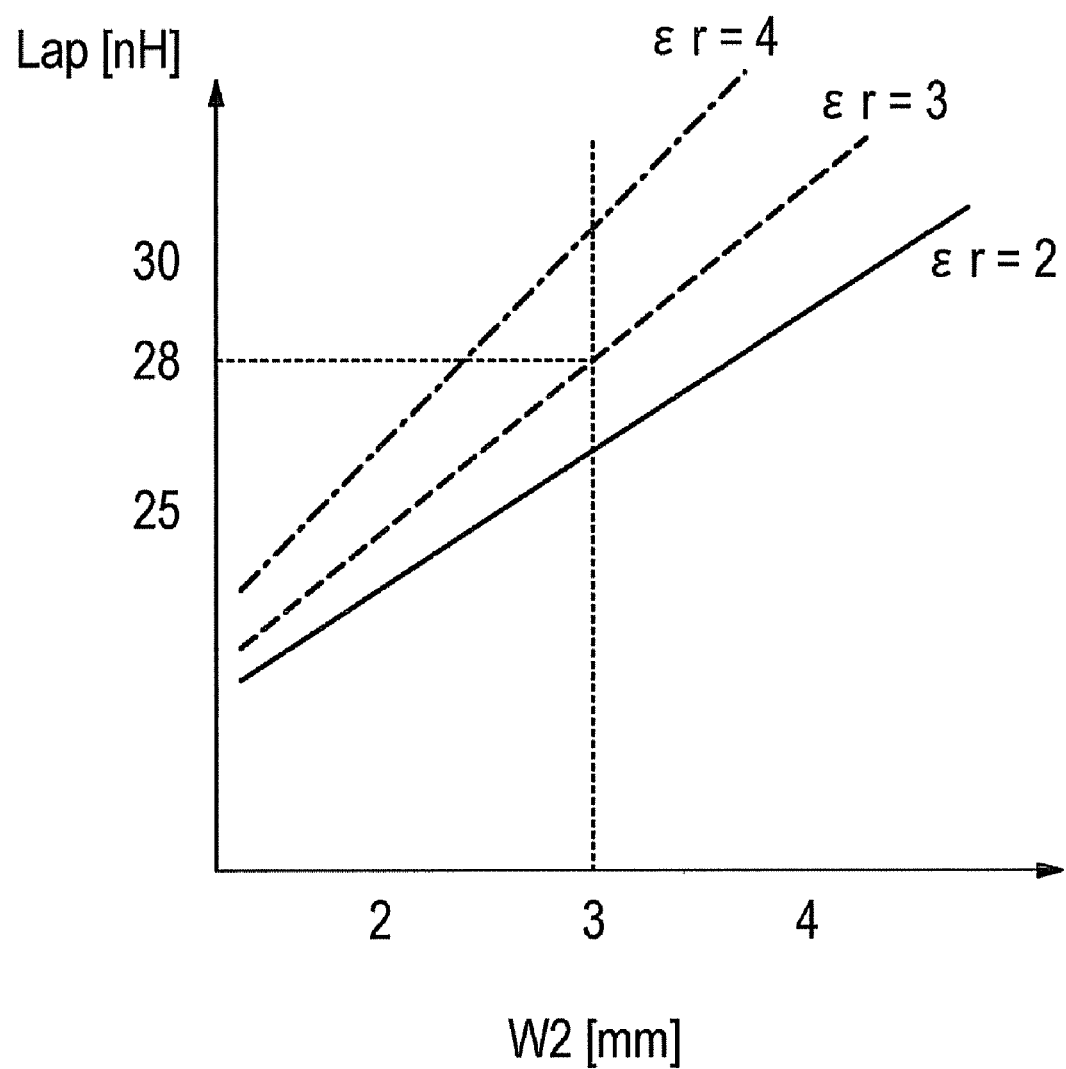
FIG. 6 is a graph illustrating relationships among the inductance of the antenna, the width of the non-covered section, and the dielectric constant of the resin.

Next, the resin 50 will be described. The resin 50 has a predetermined dielectric constant. FIG. 6 is a graph illustrating relationships among the inductance Lap of the antenna 20, the width W2 of the non-covered section 23, and the dielectric constant of the resin. For example, as the dielectric constant of the resin 50 gets larger compared with the value of the predetermined inductance Lap, the width W2 of the non-covered section 23 needs to be smaller. In other words, as the dielectric constant of the resin 50 gets larger, the length of the inductance section 21 can be shorter. For example, to use a circuit chip having a capacitance Ccp of 1.0 pF, the inductance Lap should be 28 nH according to a resonance condition, and the width W2 should be 3 mm when the dielectric constant εr of the resin 50 is 3. In this way, the width W2 of the non-covered section 23 is set in accordance with the dielectric constant of the resin 50. As a material of the resin 50, for example, a polyester resin such as a polyethylene terephthalate (dielectric constant: 3.2) in thermoplastic resins, and an epoxy resin (dielectric constant: 4.0 to 4.6) and a polyurethane resin (dielectric constant: 4.2 to 7.6) in thermosetting resins can be used.

The relationship between the dielectric constant of the resin 50 and the length of the antenna 20 will be briefly described. The size of an antenna used in a frequency band such as the UHF band needs to have a length obtained by dividing the wavelength by an even integer, for example, a length obtained by dividing the wavelength by 2. Inside of the resin 50, the wavelength of a radio wave is inversely proportional to the square root of the dielectric constant. Therefore, when using a material having a high dielectric constant as a material of the resin 50, the size of the antenna can be downsized. As a result, the higher the dielectric constant of the resin 50, the shorter the length of the antenna 20 can be. In other words, the higher the dielectric constant of the resin 50, the shorter the length of the inductance section 21 can be. As described above, the higher the dielectric constant of the resin 50, the smaller the width W2 of the non-covered section 23 can be.

Figure 7:
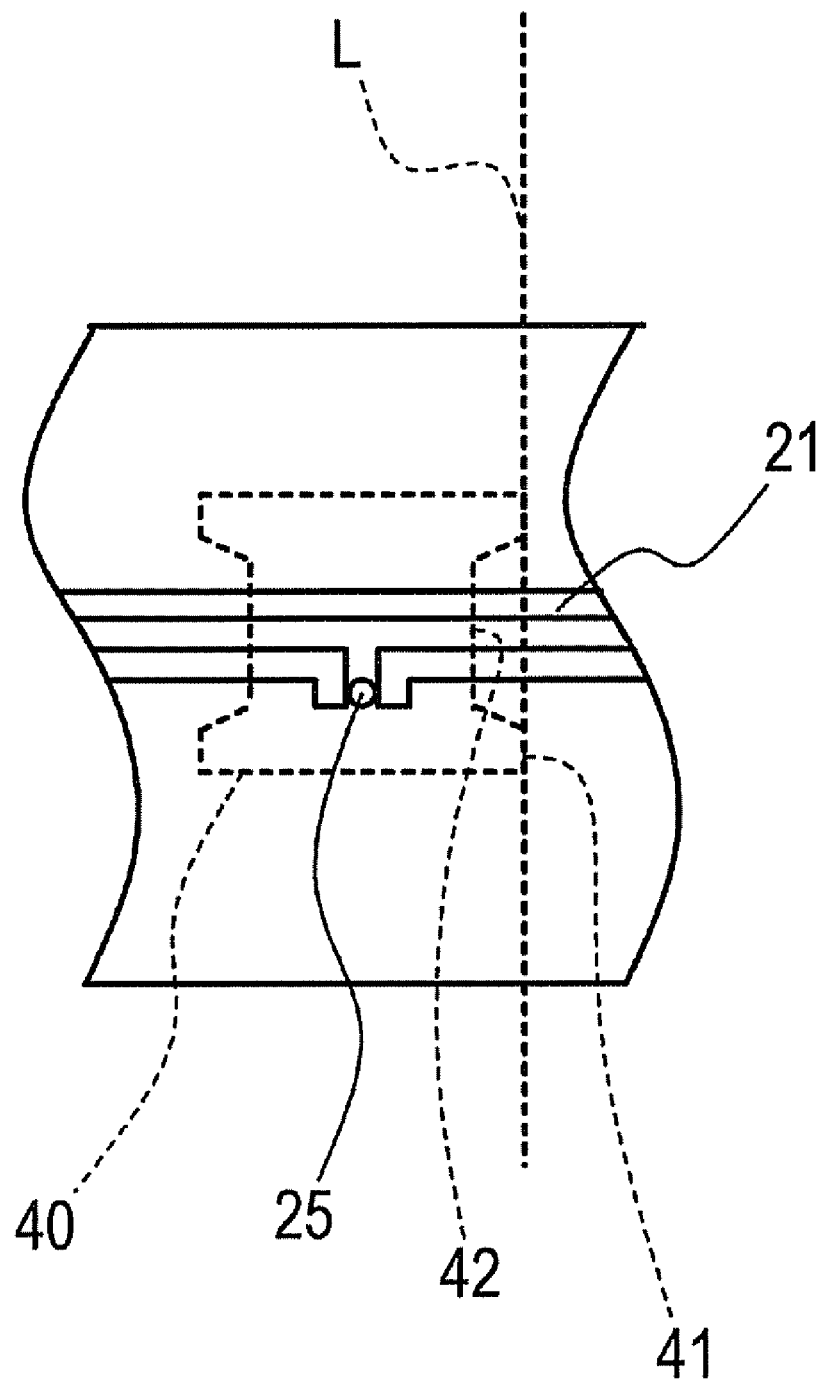
FIG. 7 is an enlarged diagram of an area around a reinforcing member in FIG. 2.

Next, the reinforcing member 40 will be described. FIG. 7 is an enlarged diagram of the area around the reinforcing member 40 in FIG. 2. The reinforcing member 40 has a first edge portion 41 not crossing the inductance section 21 and a second edge portion 42 crossing the inductance section 21. The first edge portion 41 and the second edge portion 42 shape the edge portion of the reinforcing member into a concave form. Consider a case in which the resilient base sheet 10 is bent along the extended line L on the first edge portion 41. In this case, the bending radius of the resilient base sheet 10 around the first edge portion 41 is relatively small. On the other hand, the bending radius of the resilient base sheet 10 around the second edge portion 42 is relatively large. Since the inductance section 21 crosses the second edge portion 42, the bending radius of the inductance section 21 can be suppressed to be small. In this way, a disconnection of the antenna 20 is prevented.

Next, modified examples of the antenna will be described with reference to the FIGS. 8A, 8B, 8C, and FIGS. 9A, 9B.

Figure 8A:
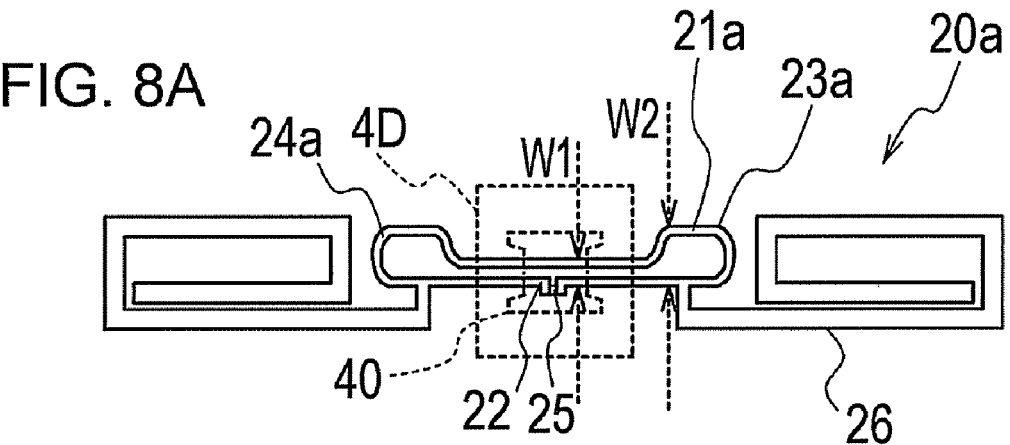
FIGS. 8A, 8B, 8C are illustrations of modified examples of the antenna.

As illustrated in FIG. 8A, an inductance section 21a has a bent portion 24s which is bent roundly. Since a large electric current flows in the inductance section 21a, the conductor loss can be suppressed by the bent portion 24a bent roundly. When the bent portion of the inductance section 21a is bent roundly as described above, the circumference length of the inductance section 21a becomes long. Therefore, the entire area of the inductance section 21a needs to be large, and when the inductance section 21a is large, the area of the dipole section 26 becomes small.

Figure 8B:
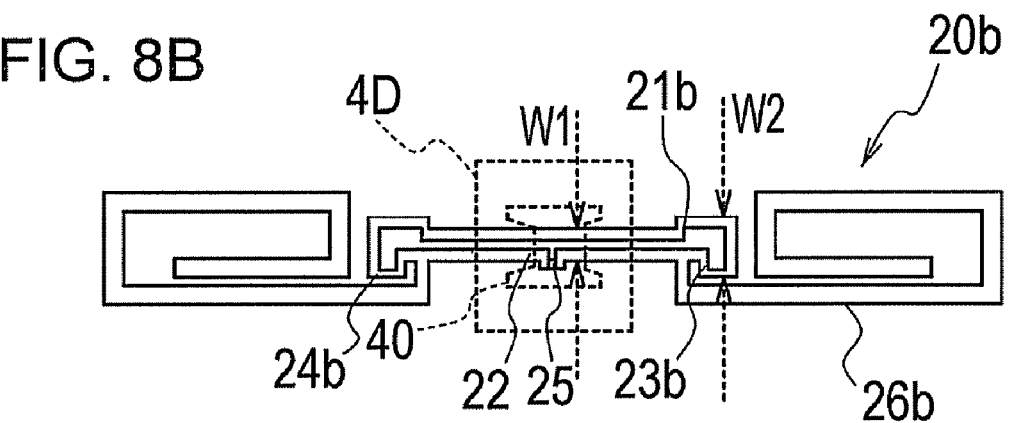

As illustrated in FIG. 8B, an inductance section 21b has a convex portion 24b protruding downwardly. By such a shape, a sufficient length of the inductance section 21b can be secured. However, since the bent portion of the inductance section 21b increases, the loss in the inductance section 21b increases.

Figure 8C:
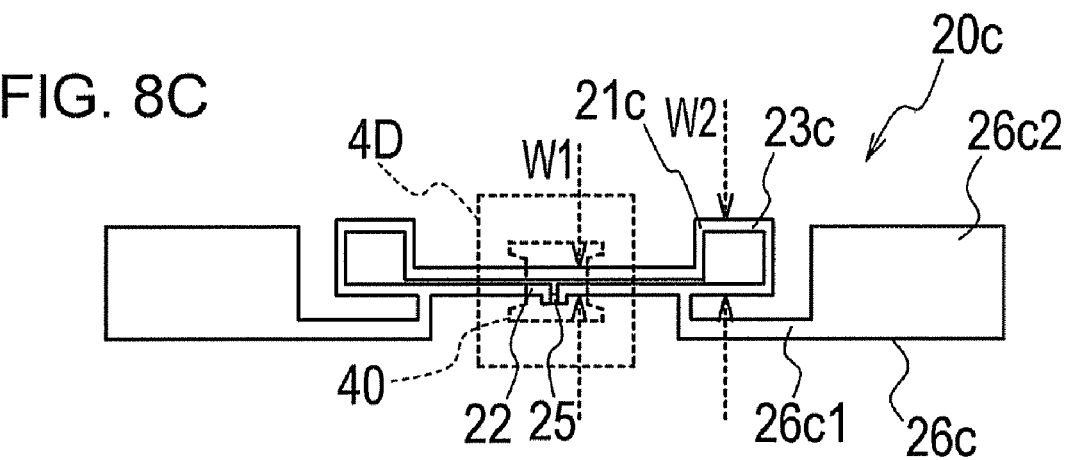

As illustrated in FIG. 8C, a dipole section 26c includes a narrow width portion 26c1 having a narrow width and a large width portion 26c2 having a large width connected to the narrow width portion 26c1. The length of the large width portion 26c2 is longer than the length of the narrow width portion 26c1. The large width portion 26c2 is formed on the top end side of the dipole section 26c. In this way, a sufficient area of the dipole section 26c can be secured, and the antenna gain increases because the dipole section 26c has fewer bent portions.

Figure 9A:
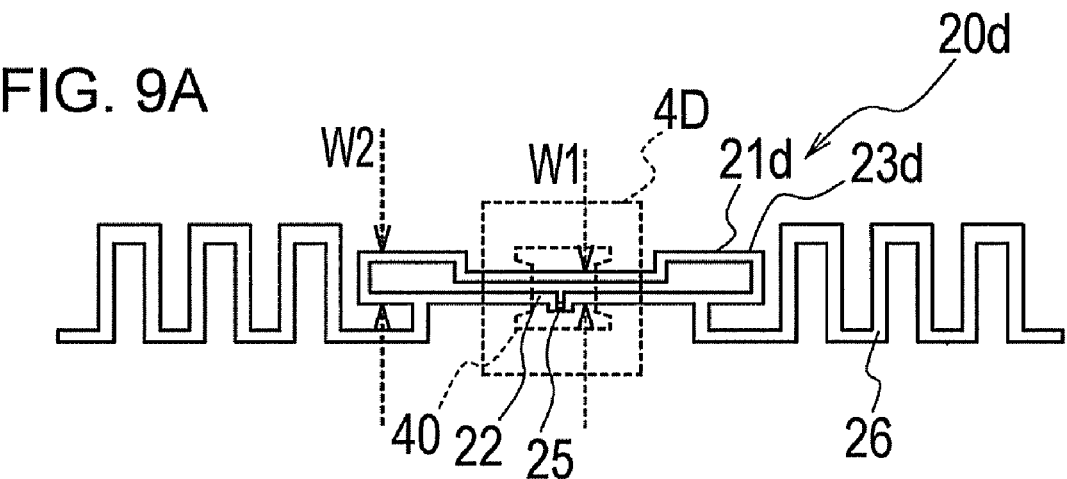
FIGS. 9A, 9B are illustrations of modified examples of the antenna.

As illustrated in FIG. 9A, a dipole section 26d of the antenna 20d has a meandering form. By such a shape, a sufficient length of the dipole section 26d can be secured.

Figure 9B:
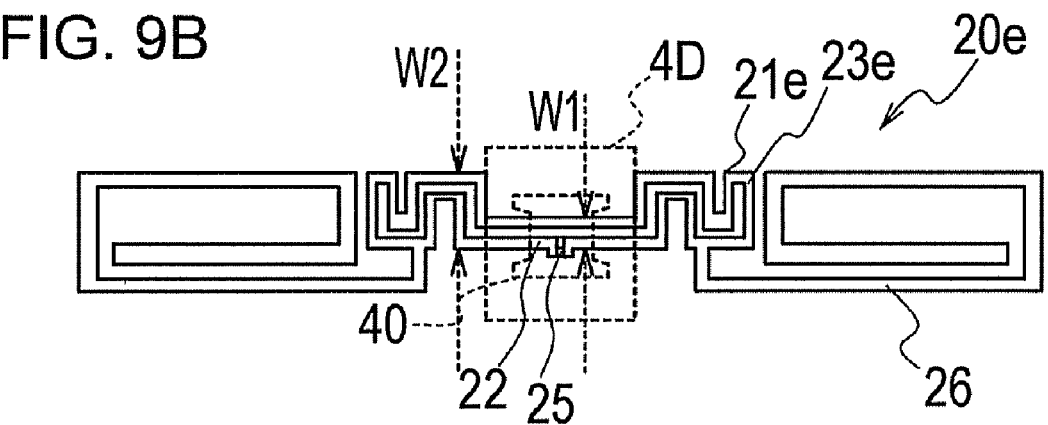

As illustrated in FIG. 9B, a non-covered section 23e of an inductance section 21e in an antenna 20e meanders. The non-covered section 23e corresponds to the meandering portion. The maximum width W2 of the non-covered section 23e is larger than the minimum width W1 of the covered section 22. Also by this, a sufficient length of the inductance section 21e can be secured.

Although a preferred embodiment of the present invention is described above, the present invention is not limited to the specific embodiment, and various variations and modifications are possible within the scope of the gist of the present invention described in the claims.

Although the wireless tag 1 is covered by the resin 50, the wireless tag 1 may not be covered by the resin 50. The entire body including the resilient base sheet 10, the antenna 20, the circuit chip 30, and the reinforcing member 40 may laminated.

All examples and conditional language recited herein are intended for pedagogical purposes to aid the reader in understanding the invention and the concepts contributed by the inventor to furthering the art, and are to be construed as being without limitation to such specifically recited examples and condition, nor does the organization of such examples in the specification relate to a showing of superiority and inferiority of the invention. Although the embodiment of the present inventions have been described in detail, it should be understood that the various changes, substitutions, and alternations could be made hereto without departing from the spirit and scope of the invention.

What is claimed is:

1. A radio frequency identification tag comprising:
   a resilient base sheet;
   an electronic component;
   a reinforcing member having at least one concave portion at a periphery of the reinforcing member; and
   an antenna including a dipole portion and an inductance portion, the inductance portion having an impedance matching with that of the electronic component and being formed in a loop shape;
   the inductance portion being partly covered by the reinforcing member,
   the loop shape of the inductance portion being narrowed where the loop shape runs under the concave portion of the periphery of the reinforcing member and being widened outside of the reinforcing member, and a width of a non-covered section of the inductance portion is larger than a width of a covered section.

2. The radio frequency identification tag according to claim 1, further comprising:
   a resin layer covering the antenna.

3. The radio frequency identification tag according to claim 2, wherein the width of the loop shape outside of the reinforcing member and a dielectric constant of the resin layer are adjusted to provide the impedance.

4. The radio frequency identification tag according to claim 1, wherein the maximum width of the loop shape outside of the reinforcing member is larger than the minimum width of the loop shape covered with the reinforcing member.

5. The radio frequency identification tag according to claim 1, wherein the inductance portion is formed in a concave form.

6. The radio frequency identification tag according to claim 1, wherein the inductance portion has a convex portion protruding downwardly.

7. The radio frequency identification tag according to claim 1, wherein the inductance portion has a bent portion which is bent roundly.

8. The radio frequency identification tag according to claim 1, wherein the inductance portion has a meandering portion which meanders.

9. The radio frequency identification tag according to claim 1, wherein the dipole portion has a spiral form or a meandering form.

10. The radio frequency identification tag according to claim 1, wherein the dipole portion includes a narrow width portion having a narrow width and a large width portion having a large width connected to the narrow width portion.

11. The radio frequency identification tag according to claim 10, wherein the length of the large width portion is longer than the length of the narrow width portion.

12. An antenna used in a radio frequency identification tag, the radio frequency identification tag including a resilient sheet, an electronic component and reinforcing member having at least one concave portion at a periphery of the reinforcing member, the antenna comprising:
    a dipole portion; and
    an inductance portion having an impedance matching with that of the electronic component and being formed in a loop shape;
    the inductance portion being partly covered by the reinforcing member,
    the loop shape of the inductance portion being narrowed where the loop shape runs under the concave portion of the periphery of the reinforcing member and widened outside of the reinforcing member, and a width of a non-covered section of the inductance portion is larger than a width of a covered section.

13. The antenna according to claim 12, wherein the maximum width of the loop shape outside of the reinforcing member is larger than the minimum width of the loop shape covered with the reinforcing member.

14. The antenna according to claim 12, wherein the inductance portion is formed in a concave form.

15. The antenna according to claim 12, wherein the inductance portion has a convex portion protruding downwardly.

16. The antenna according to claim 12, wherein the inductance portion has a bent portion which is bent roundly.

17. The antenna according to claim 12, wherein the inductance portion has a meandering portion which meanders.

18. The antenna according to claim 12, wherein the dipole portion has a spiral form or a meandering form.

19. The antenna according to claim 12, wherein the dipole portion includes a narrow width portion having a narrow width and a large width portion having a large width connected to the narrow width portion.

20. The antenna according to claim 19, wherein the length of the large width portion is longer than the length of the narrow width portion.

* * * * *